(12) United States Patent
Springer, Sr.

(10) Patent No.: US 7,370,081 B2
(45) Date of Patent: May 6, 2008

(54) METHOD, SYSTEM, AND PROGRAM FOR COMMUNICATION OF CODE CHANGES FOR TRANSMISSION OF OPERATION REQUESTS BETWEEN PROCESSORS

(75) Inventor: James Alan Springer, Sr., Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 882 days.

(21) Appl. No.: 10/465,116

(22) Filed: Jun. 19, 2003

(65) Prior Publication Data

US 2004/0260773 A1 Dec. 23, 2004

(51) Int. Cl.
*G06F 15/16* (2006.01)
(52) U.S. Cl. .................. 709/208; 718/100; 718/102; 718/105
(58) Field of Classification Search ............... 709/208; 718/100, 102, 105
See application file for complete search history.

(56) References Cited

U.S. PATENT DOCUMENTS

| | | | | |
|---|---|---|---|---|
| 5,450,555 | A * | 9/1995 | Brown et al. ............... | 712/228 |
| 7,046,676 | B2 * | 5/2006 | Goetzinger et al. ....... | 370/395.4 |
| 2003/0005025 | A1 * | 1/2003 | Shavit et al. ............... | 709/102 |
| 2004/0024894 | A1 | 2/2004 | Osman et al. | |
| 2004/0054853 | A1 * | 3/2004 | Sprangle et al. ........... | 711/137 |
| 2004/0260748 | A1 | 12/2004 | Springer et al. | |

OTHER PUBLICATIONS

Herlihy et al., "Low Contention Load Balancing on Large-Scale Multiprocessors", ACM Symposium on Parallel Algorithms and Architectures, pp. 219-227, 1992.
Wang et al., "Load Balancing Policies in Heterogeneous Distributed Systems", System Theory, 1994, Proceedings of the 26th Southeastern Symposium on Mar. 20-22, 1994, pp. 473-477.
U.S. Patent Application entitled "Method, System, and Program for Communication Code Changes", filed Sep. 9, 2007, U.S. Appl. No. 11/851,878, by inventor J.A. Springer Sr., T.C. Jarvis, G.A. Spear, S.C. Werner, R.K. Martinez, M. Sanchez and T.M. Brown.

* cited by examiner

*Primary Examiner*—Krisna Lim
(74) *Attorney, Agent, or Firm*—William K. Konrad; Konrad Raynes & Victor LLP

(57) ABSTRACT

Provided are a method, system, and program for managing communication code changes between processors in which a local processor sends remote operation requests to be executed by a remote processor. In the illustrated embodiment, the local processor and the remote processor each have a control set for managing transfers of remote operation requests. The remote processor control set includes a queue for queuing remote operation requests awaiting execution. The control set of the local processor includes a credit counter which keeps track of permissible outstanding remote operation requests. The remote processor populates a configuration structure with information concerning the remote processor control set including the size of the queue and sends the configuration structure to the local processor. The local processor extracts the information from the configuration structure and configures the local processor control set. In the configuration, the credit counter is initialized in accordance with the capacity of the remote processor control set queue.

20 Claims, 9 Drawing Sheets

METHOD, SYSTEM, AND PROGRAM FOR COMMUNICATION OF CODE CHANGES FOR TRANSMISSION OF OPERATION REQUESTS BETWEEN PROCESSORS

RELATED APPLICATIONS

This application is related to copending application entitled METHOD, SYSTEM, AND PROGRAM FOR REMOTE RESOURCE MANAGEMENT, assigned to the assignee of the present application, filed on Jun. 19, 2003 and 10/465,177.

BACKGROUND OF THE INVENTION

1. Field of the Invention

The present invention relates to a method, system, and program for changing communication codes between a local and a remote processor.

2. Description of the Related Art

Computing systems often include one or more host computers ("hosts") for processing data and running application programs, direct access storage devices (DASDs) for storing data, and a storage controller for controlling the transfer of data between the hosts and the DASD. Storage controllers, also referred to as control units or storage directors, manage access to a storage space often comprised of numerous hard disk drives connected in a loop architecture, otherwise referred to as a Direct Access Storage Device (DASD). Hosts may communicate Input/Output (I/O) requests to the storage space through the storage controller.

To maintain availability in the event of a failure, many storage controllers known in the prior art provide redundant hardware clusters. Each hardware cluster comprises a processor complex, cache, non-volatile storage (NVS), such as a battery backed-up Random Access Memory (RAM), and separate power supply to provide connection paths to the attached storage. The NVS in one cluster backs up write data from the cache in the other cluster so that if one cluster fails, the write data in the cache of the failed cluster is stored in the NVS of the surviving cluster. After one cluster fails, all Input/Output (I/O) requests would be directed toward the surviving cluster. When both clusters are available, each cluster may be assigned to handle I/O requests for specific logical storage devices configured within the physical storage devices.

In performing these and other tasks, a cluster can not only execute operations locally using the capabilities of the local cluster itself, but can also make a request to have an operation executed on a remote cluster in the storage controller system. Since the capabilities of the remote cluster are typically limited, it is often desirable that the local cluster refrain from requesting too many remote operations which could result in the capabilities of the remote cluster being exceeded.

Various techniques have been proposed for limiting or "throttling" the requesting of remote operations on a remote cluster. One such technique allows only a single remote operation to proceed on the remote cluster. Once the remote cluster responds that the remote operation is complete, the local cluster is permitted to request another remote operation. As a consequence, the remote cluster handles a single remote operation at a time.

FIG. 1 shows an example of a multiple cluster system 10 comprising a first cluster 12 communicating with a second cluster 14 over a bus 16. In this example, an application program 18 operating under an operating system 20 of the first or local cluster 12 instructs a mail manager 22 to send a remote operation request to the second or remote cluster 14. The mail manager 22 folds the remote operation request into a mail message and stores the mail message containing the remote operation request in a memory area 24 of the remote cluster 14. The memory area 24 referred to in FIG. 1 as a "incoming mail queue" functions as a queue of mail messages, some of which include remote operations waiting to be executed.

Each remote operation is executed on the remote cluster 14. The remote cluster 14 has a mail manager 26 which examines the operation code of the remote operation in each mail message stored in the queue 24 in the order in which they are stored in the queue 24. Using the operation code, the mail manager 26 invokes the remote operation. Once the remote operation is initiated, the mail message entry is removed from the queue 24 and a mail message is sent back to the local cluster 12 indicating that an additional remote operation may be sent to the remote cluster 14.

The mail manager 22 of the local cluster 12 is kept apprised by the mail manager 26 of the remote cluster 14, of how many mail message entries remain in the queue 24 of the remote cluster 14. In one prior system, the mail manager has a counter 37 which keeps a count of the permissible number of mail messages which may be sent to the other cluster 14 and stored as entries in the incoming mail queue 24 before mail messages are removed from the queue 24. Thus, each count of the counter 37 may be thought of as a "credit" permitting the sending of a mail message to the other cluster 14.

The maximum count or credits of the counter 37 is equal to the total capacity or total number of entries of the incoming mail queue 24. As mail messages are sent to the other cluster 14, the credits of the counter 37 are decremented by the mail manager 22. The mail messages may include remote operation requests. As these and other mail messages are processed and removed from the incoming mail queue 24, the mail manager 26 so informs the mail manager 22 and the credits of the counter 37 are incremented. Once the capacity of the queue 24 is reached as indicated by the counter 37 indicating that all available credits have been used up, the mail manager 22 of the local cluster withholds sending new mail messages to the remote cluster queue 24 until additional credits are applied to the counter 37, indicating that slots have become available in the queue 24. In the meantime, the mail manager 22 stores remote operation requests and other mail in an outgoing mail queue 28 until the remote operation requests can be sent as mail messages to the remote cluster 14.

The second cluster 14 similarly has one or more application programs 38 operating under an operating system 40, which instructs the mail manager 26 to send a remote operation request to the first cluster 14 in the form of a mail message. The mail manager 26 stores the mail message containing the remote operation request as an entry in an incoming mail queue 44 of the first cluster 12. Operation of the remote operation request is invoked by the mail manager 22 of the first cluster 12. Once the incoming mail queue 44 of the first cluster 12 becomes full as indicated by a credit counter 46, the mail manager 26 of the second cluster 14 stores the mail messages in an outgoing mail queue 48 until additional space becomes available in the queue 44.

As previously mentioned, one purpose of redundant clusters is to ensure that if one cluster fails, the storage controller or other device may continue to operate. In such redundant applications, it is often desired that at least one cluster operate at all times so that operation of the device is not interrupted. As a result, when upgrading the software or code of the device, the software is often upgraded on one cluster while the other cluster continues to run. Then, the upgraded cluster is restarted and the software on the other cluster is upgraded. As a consequence, there may be intervals when the software code running the two clusters may be not be at the same level on both clusters. When the software on a cluster is upgraded and the cluster is restarted or booted, the booted cluster may inform the other cluster of the software level of the booted cluster. In one prior art system, this software level information may take the form of a version number of the loaded software.

SUMMARY OF THE DESCRIBED IMPLEMENTATIONS

Provided are a method, system, and program for managing communication code changes between processors in which a local processor sends remote operation requests to be executed by a remote processor. In the illustrated embodiment, a local processor receives from a remote processor a configuration structure indicating the maximum number of entries in a first queue maintained by the remote processor. Each entry in the first queue is capable of storing a remote operation request of a first resource type sent to the remote processor from a local processor to await execution in connection with a first resource in the remote processor. Using the configuration structure, the local processor initializes a first count of credits of a first resource type control set maintained by a local processor wherein the first count of credits represents the maximum number of entries in the first queue.

In another aspect, the local processor receives from the remote processor a configuration structure indicating the maximum number of entries in a second queue maintained by the remote processor wherein each entry in the second queue is capable of storing a remote operation request of a second resource type sent to the remote processor from the local processor to await execution in connection with a second resource in the remote processor. In addition, the local processor initializes a second count of credits of a second resource type control set maintained by the local processor wherein the second count of credits represents the maximum number of entries in the second queue.

In yet another aspect, a configuration structure is sent by the remote processor to the local processor as a part of a boot-up sequence of the remote processor.

In still another aspect, the configuration structure indicating the maximum number of entries in the first queue is a first control set configuration structure which also includes identification information which identifies the first resource type. In addition the configuration structure indicating the maximum number of entries in the second queue is a second control set configuration structure which includes identification information which identifies the second resource type.

In another aspect, the local processor receives from the remote processor a master configuration structure which identifies the number of control set configuration structures being sent to the local processor by the remote processor.

In yet another aspect, at least one configuration structure includes reserved fields. These reserved fields may be used for example to accommodate future modifications.

In still another aspect, the first and second queues for storing remote operation request are generated by software executed by the remote processor and the master modification structure includes information which identifies the version of the remote operation request queue software. This information may be used for example to block the sending of remote operation requests to the remote processor which are not supported by the remote processor software.

BRIEF DESCRIPTION OF THE DRAWINGS

Referring now to the drawings in which like reference numbers represent corresponding parts throughout.

DETAILED DESCRIPTION OF ILLUSTRATED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 2:
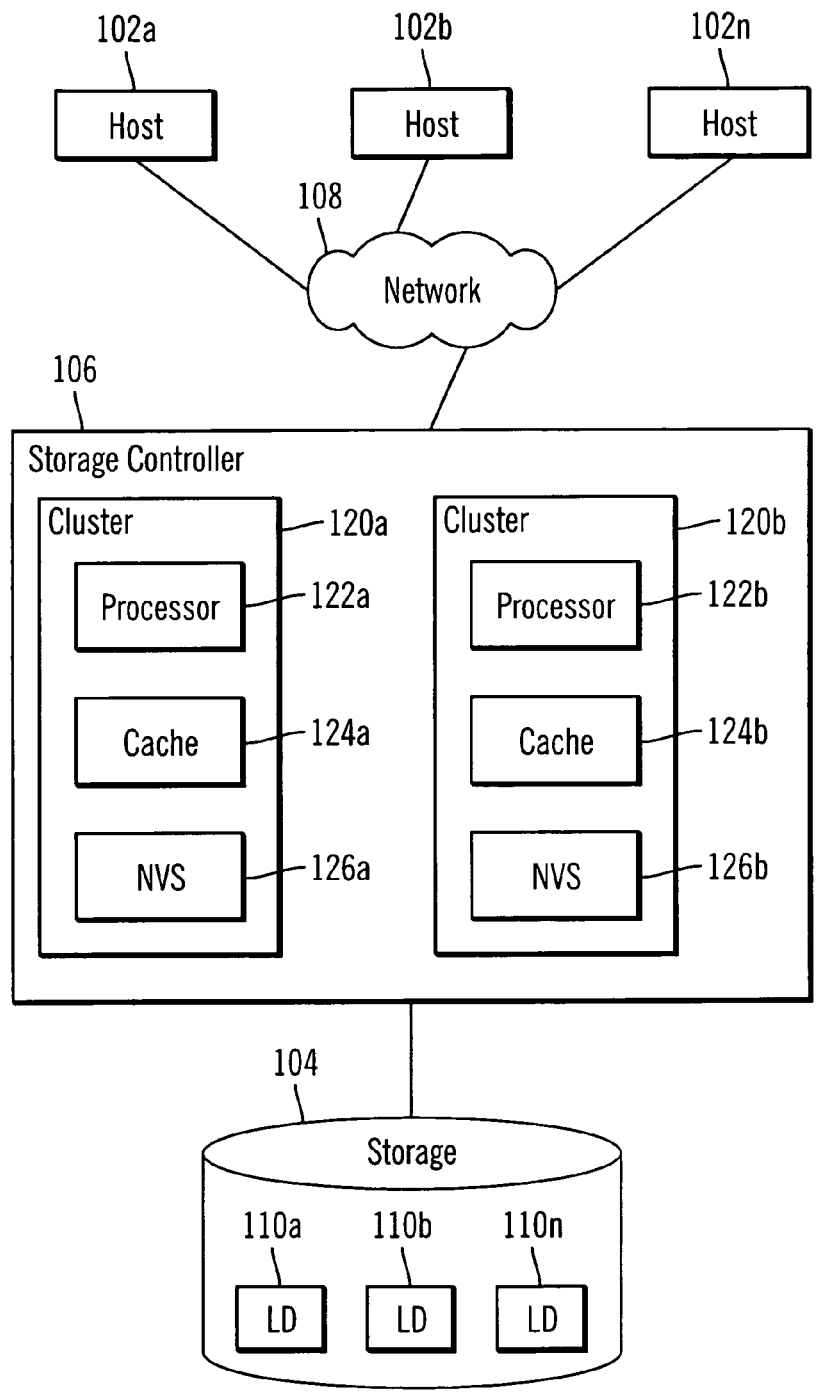
FIG. 2 illustrates an example of a computing environment in which aspects of the invention are implemented.

FIG. 2 illustrates a computing architecture in which aspects of the invention are implemented. One or more hosts 102a, 102b . . . 102n are in data communication with a storage system 104, such as a DASD or any other storage system known in the art, via a storage controller 106. The host 102 may be any computing device known in the art, such as a server, mainframe, workstation, personal computer, hand held computer, laptop, telephony device, network appliance, etc. The storage controller 106 and host system(s) 102 communicate via a network 108, which may comprise a Storage Area Network (SAN), Local Area Network (LAN), Intranet, the Internet, Wide Area Network (WAN), etc. The storage system 104 may be comprised of hard disk drives, tape cartridge libraries, optical disks, or any suitable non-volatile storage medium known in the art. The storage system 104 may be arranged as an array of storage devices, such as a Just a Bunch of Disks (JBOD), DASD, Redundant Array of Independent Disks (RAID) array, virtualization device, etc. The storage controller 106 may comprise any storage controller or server known in the art, such as the IBM Enterprise Storage Server (ESS) or any other storage controller known in the art. In certain implementations, the storage space in the storage controller 104 is configured as a plurality of logical devices (LD) 110a, 110b . . . 110n.

The storage controller 106 includes two separate clusters 120a, 120b of hardware components to provide redundancy for improved availability. Although the illustrated embodiment is described in connection with a storage controller having clusters, it is appreciated that the invention may be applicable to a variety of systems utilizing multiple processors in which one processor can direct operations to be executed by another processor.

Each cluster 120a, 120b of the illustrated embodiment may be maintained on a separate power boundary, and includes a processor complex 122a, 122b, a cache 124a, 124b, and a non-volatile storage unit (NVS) 126a, 126b. The NVS 126a, 126b may comprise a battery backed-up RAM or any other type of non-volatile or volatile backup cache used to backup data in cache. The hosts 102a, 102b . . . 102n would submit application I/O requests directed to a target logical device (LD) 110a, 110b . . . 110n, including write data, to the cluster 120a, 120b to which the target logical device (LD) 110a, 110b . . . 110n is assigned. The NVS 126a, 126b in one cluster 120a, 120b is used to backup write data in the cache 124b, 124a in the other cluster 120b, 120a, e.g., NVS 126a backs up write data in cache 124b.

In describing the logic of FIGS. 3-7, cluster 120a will be described as the local or sending cluster and cluster 120b as the remote or receiving cluster. Notwithstanding, the logic described in FIGS. 3-7 is capable of being executed by both processor complexes 122a, 122b in both clusters 120a, 120b in the storage controller 106 so that either cluster 102a, 102b may direct remote operations to be executed using the resources of the other.

Figure 3A:
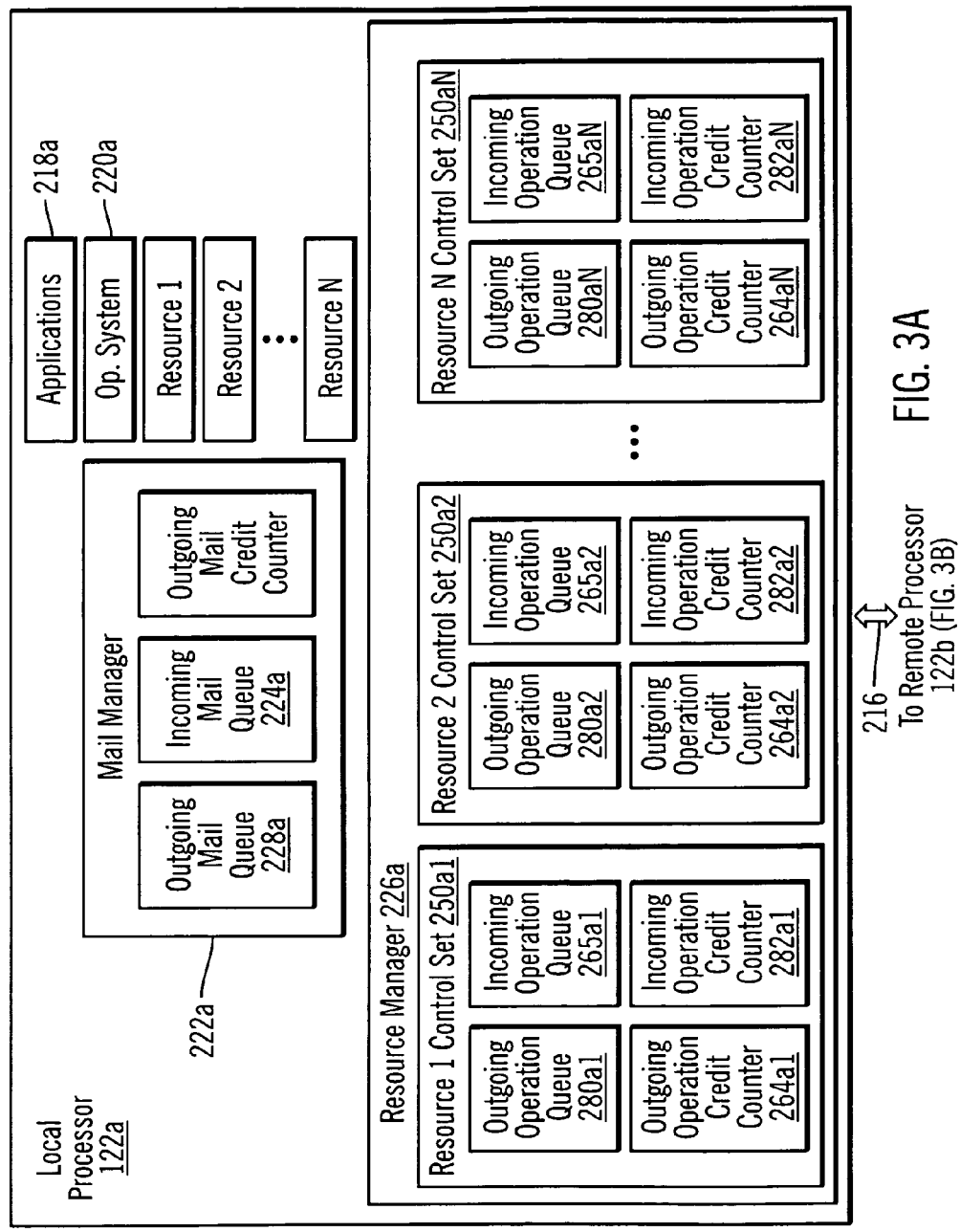
FIGS. 3A-3B illustrate an architecture of a remote operation manager of first and second processors utilized with implementations of the invention.
Figure 3B:
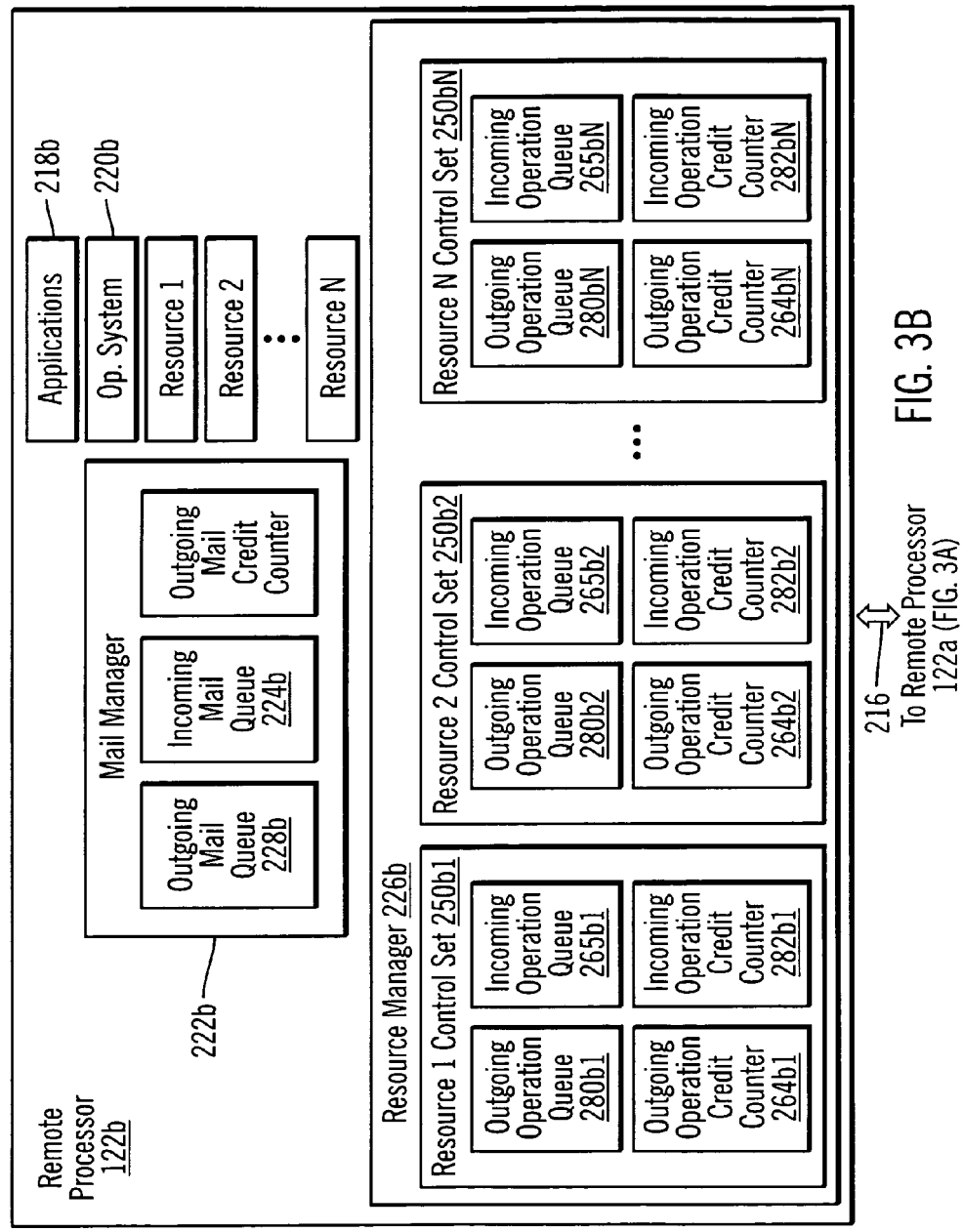

FIGS. 3A and 3B shows an example of the processor complex 122a communicating with the second processor complex 122b over a bus 216. In this example, each processor complex 122a, 122b has an application program 218a, 218b operating under an operating system 220a, 220b, which instructs a mail manager 222a, 222b to send a remote operation request to the other processor complex 122a, 122b. Each mail manager 222a, 222b has an incoming mail queue 224a, 224b and operates in a manner similar to the mail managers 22, 42 of FIG. 1. Thus, the mail manager 222a stores the remote operation request of the processor complex 122a as an entry in the incoming mail queue 224b of the other processor complex 122b. Once the capacity of the incoming mail queue 224b is reached, the mail manager 222a of the processor complex 122a stores remote operation requests in an outgoing mail queue 228a until the remote operation requests can be sent to the other processor complex 122b. The other mail manager 222b similarly stores the remote operation request of the processor complex 122b as an entry in the incoming mail queue 224a of the other processor complex 122a. Once the capacity of the incoming mail queue 224a is reached, the mail manager 222b of the processor complex 122b stores remote operation requests in an outgoing mail queue 228b until the remote operation requests can be sent to the other processor complex 122a. It is appreciated that other mail type arrangements may be used to send operations from one processor to another processor for execution by the other processor.

In the illustrated embodiment, each processor complex 122a, 122b has a plurality of resources, resource 1, resource 2 . . . resource N, each resource being used in connection with the execution of operations. For example, each resource may be a type of Task Control Blocks, each of which acts as a "ticket" which permits a task to proceed. However, it is appreciated that a resource may be any finite item which is dynamically allocated and which is used to initiate, continue or complete an operation. Also, in some embodiments, the processor complexes may have only one type of resource.

In addition, each processor complex 122a, 122b has a resource manager 226a, 226b which manages the appropriate resource 1, resource 2 . . . or resource N of the processor complex which permits an operation to be initiated by that resource. In the illustrated embodiment, the resource manager 226a includes a control set 250a1, 250a2 . . . 250aN for each type of resource, that is, resource 1, resource 2 . . . resource N, it is managing of the processor complex 122a. In a similar manner, the resource manager 226b includes a control set 250b1, 250b2 . . . 250bN for each type of resource, that is, resource 1, resource 2 . . . resource N it is managing of the processor complex 122b. Thus, for example, resource1 of processor complex 122a has associated with it control set 250a1 of resource manager 226a. As explained in greater detail below, such an arrangement permits the resource managers 226a, 226b to manage multiple types of resources without reference to the details of the type of resources it is allocating.

Figure 4:
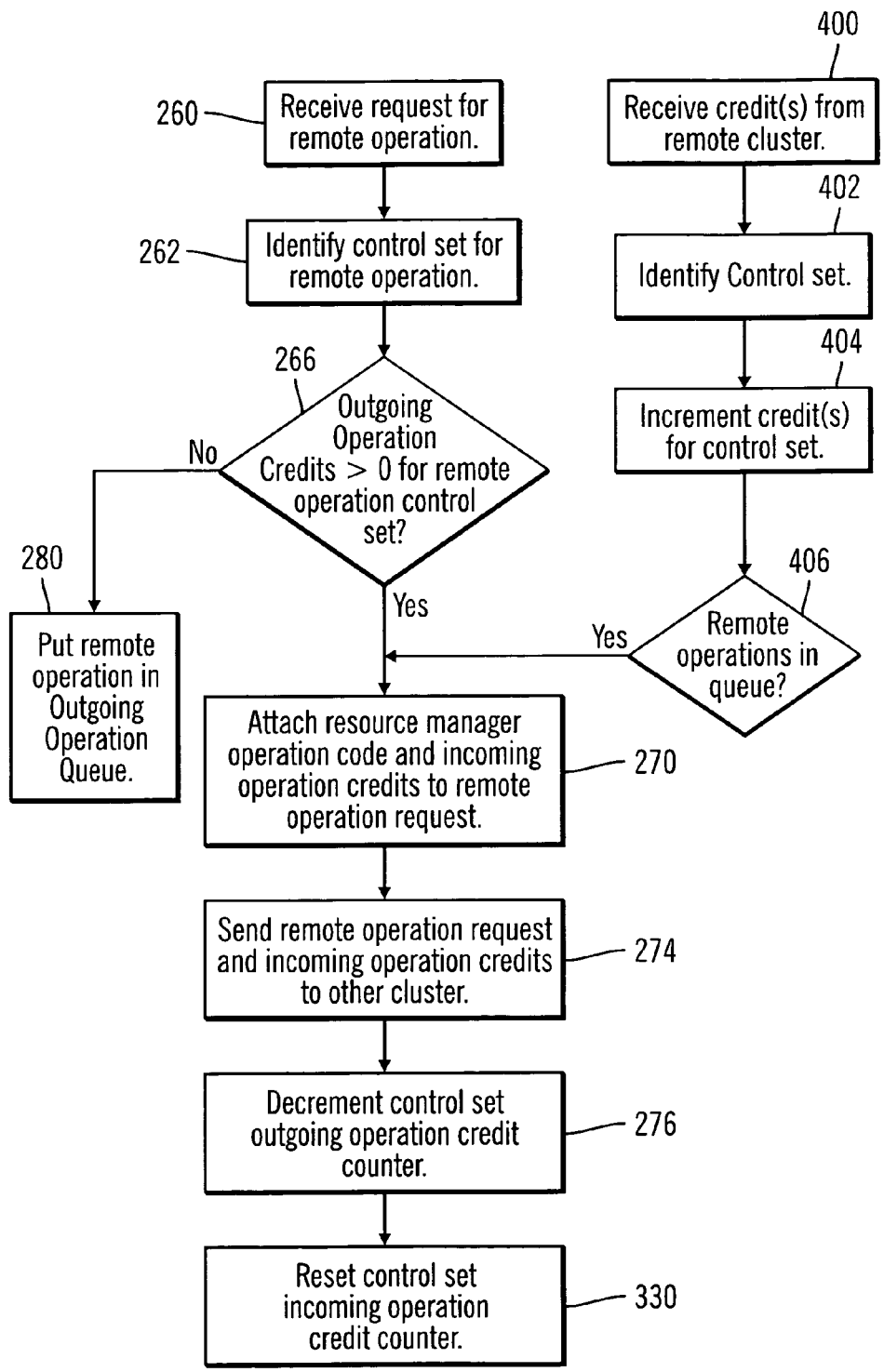
FIGS. 4-5 illustrate logic to manage resources between processors in accordance with implementations of the invention.

FIG. 4 illustrates operations of the resource manager 226a when an application 218a of the processor complex 122a requests execution of a remote operation by the other processor complex 122b. To request a remote operation, an application 218a invokes the resource manager 226a which receives (block 260) the request for the remote operation. The resource manager 226a identifies (block 262) which of the resources, resource 1-resource n, of the processor complex 122b is needed to execute the requested remote operation.

The resource manager 226a uses the appropriate control set 250a1 . . . 250aN for the identified resource 1-resource N to determine whether the remote operation can be sent to the remote processor complex 122b for execution or the sending of the remote operation should be delayed. Each control set 250a1-250aN keeps a count of the permissible outstanding remote operations for that resource in an outgoing operation counter 264a1-264aN. The maximum possible count for each control set 250a1-250aN represents the maximum number of remote operations that can be sent to the other processor complex 122b without exceeding the available capacity of the associated resource 1-resource N.

In the illustrated embodiment, each control set 250b1-250bN of the other processor complex 122b has an incoming operation queue 265b1-265bN in which remote operations may be queued if the particular resource associated with the control set is not available to initiate the remote operation. Each incoming operation queue 265b1-265bN of the other processor complex 122b has a predetermined capacity for storing remote operations awaiting initiation. The maximum count of the outgoing operation credit counter 264a1-264aN of each control set 250a1-250aN of the processor complex 122a corresponds to the capacity of the counterpart incoming operation queue 265b1-265bN of the other processor complex 122b. Thus, the count of permissible remote operations can be thought of as "credits" in which the resource manager 226a is permitted to send a remote operation to be executed in connection with an associated resource of the other processor complex 122b for each credit stored on the associated counter 264a1-264aN of the identified control set 250a1-250aN.

When the count permits, that is, when the number of credits remaining as indicated by the outgoing operation credit counter 264a1-264aN is greater than zero (block 266), the remote operation is sent (blocks 270-274) to the other processor complex 122b of the remote cluster 120b. The count of the associated outgoing operation credit counter 264a1-264aN is then decremented (block 276). Thus, the count of the appropriate credit counter 264a1-264aN is decremented as remote operations are sent to the other processor complex 122b. Once the count of the credit counter 264a1-264aN reaches zero (block 266), the capacity of the counter part incoming operation queue 265*b*1-265*b*N may be exceeded if another remote operation is sent to that queue. Accordingly, the resource manager 226*a* queues (block 280) the remote operation as an entry in the associated outgoing operation queue 280*a*1-280*a*N of the control set 250*a*1-250*a*N. As explained in greater detail below, the remote operation will remain in the queue 280*a*1-280*a*N until an outgoing operation credit becomes available for the associated control set 250*a*1-250*a*N. The outgoing operation credits are incremented as remote operations are completed on the remote processor complex 122*b* as described in connection with FIG. 5 below.

If, for example, a requested remote operation is to be executed in connection with resource 1 of the remote processor complex 122*b*, the resource manager 226*a* identifies (block 262) control set 250*a*1 for the resource 1 and checks the outgoing operation counter 264*a*1 of the control set 250*a*1. When the number of credits remaining as indicated by the outgoing operation credit counter 264*a*1 is greater than zero (block 266), the remote operation is sent (blocks 270-274) to the other processor complex 122*b* of the remote cluster 120*b* and the outgoing operation credit counter 264*a*1 is decremented (block 276). Otherwise, the resource manager 226*a* queues (block 280) the remote operation as an entry in the associated outgoing operation queue 280*a*1 of the control set 250*a*1 until a credit for control set 250*a*1 becomes available.

Although the illustrated embodiment utilizes a threshold of zero credits for delaying the sending of additional remote operation requests to the other processor complex, it is appreciated that other thresholds may be selected, depending upon the particular application.

In the illustrated embodiment, the resource managers 226*a* sends a remote operation request to the other processor complex 122*b* by placing the requested remote operation in a mail message and embedding (block 270) a resource manager operation code into the mail message. In addition, as explained below, the resource manager notes the count indicated by an incoming operation credit counter 282*a*1-282*a*N and embeds this count along with the resource manager operation code into the mail message. This mail message is passed (block 274) to the mail manager 222*a* which stores it in the incoming mail queue 224*b* of the mail manager 228*b* of the processor complex 122*b*. Upon passing the mail message containing the remote operation request to the mail manager 222*a*, the resource manager 226*a* decrements (block 276) the associated outgoing operation credit counter 264*a*1-264*a*N of the identified control set 250*a*1-250*a*N associated with the resource of resource 1-resource N which will execute the requested remote operation.

In a similar manner, FIG. 4 illustrates operations of the resource manager 122*b* when an application 218*b* of the processor complex 122*b* requests execution of a remote operation by the other processor complex 122*a*. Thus, each control set 250*b*1-250*b*N of the resource manager 122*b* includes an outgoing operation credit counter 264*b*1-264*b*N to keep track of permissible outstanding remote operations for each associated resource1-resource N of the other processor complex 122*a*. Each control set 250*b*1-250*b*N includes an outgoing operation queue 280*b*1-280*b*N to store requested remote operation requests until a credit becomes available to send the remote operation request to the other processor complex 122*a*. Each control set 250*b*1-250*b*N still further includes an incoming operation credit counter 282*b*1-282*b*N described below.

Figure 5:
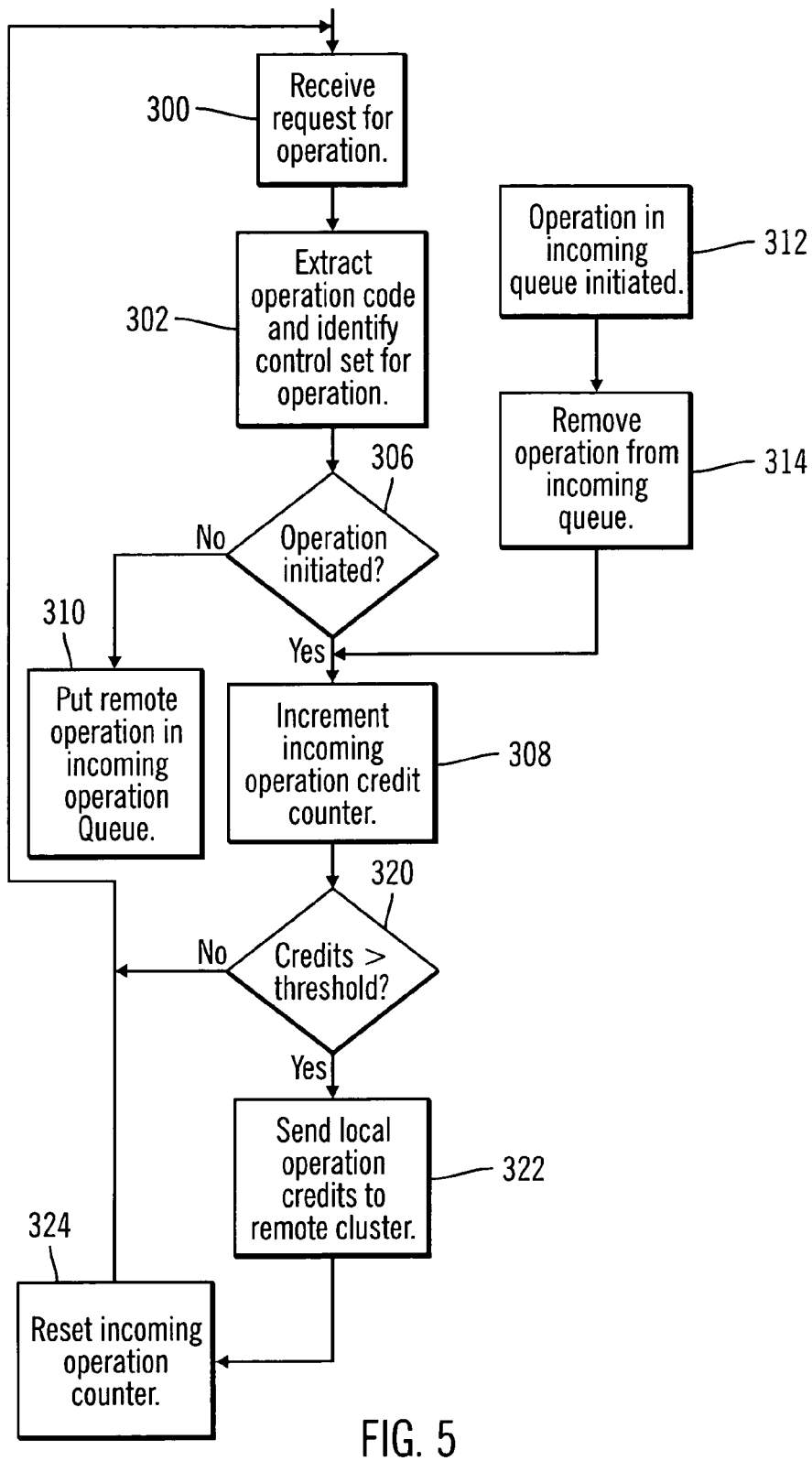

FIG. 5 illustrates operations of the resource manager 226*b* when a request for a remote operation is received (block 300) from the other processor complex 122*a*. As previously mentioned, the mail manager 222*a* of the processor complex 122*a* writes the mail message containing the requested remote operation as an entry in the incoming mail queue 224*b* of the mail manager 222*b* of the processor complex 122*b*. The mail manager 222*b* reads the resource manager operation code embedded in the mail message by the resource manager 226*a* of the processor complex 122*a* as described above, and informs the resource manager 226*b* of the processor complex 122*b* by passing a pointer to the mail message entry to the resource manager 226*b*. In response, the resource manager 226*b* extracts (block 302) the requested operation from the mail message and identifies the control set of the control sets 250*b*1-250*b*N which is associated with the particular resource, resource 1-resource N, needed to execute the requested remote operation in the mail message.

If the requested operation is successfully initiated (block 306), that is the resource of resource 1-resource N was available for the requested operation, processor complex 122*b* is ready for the processor complex 122*a* to send another remote operation request for that particular resource 1-resource N. Hence, an incoming operation credit counter 282*b*1-282*b*N of the identified control set 250*b*1-250*b*N is incremented (block 308), to indicate that another remote operation may be sent by the processor complex 122*a*.

If on the other hand, the requested operation was not initiated (block 306) because the resource could not be allocated to initiate the requested remote operation, the operation is placed (block 310) as an entry in the incoming operation queue 265*b*1-265*b*N of the identified control set. The incoming operation credit counter 282*b*1-282*b*N of the identified control set 250*b*1-250*b*N is not incremented because a slot of the incoming operation queue 265*b*1-265*b*N was used to store the queued remote operation. However, the resource manager 226*a* may continue to send remote operation requests for that resource1-resourceN so long as there are credits indicated by the associated outgoing operation credit counter 264*a*1-264*a*N as described above until the credits are used up, indicating that the associated incoming operation queue 265*b*1-265*b*N is filled to capacity.

Once the associated resource of the resources 1-N can be allocated, the first remote operation in the incoming operation queue 265*a*1-265*a*N to be executed in connection with that resource 1-resource N is initiated (block 312) and removed (block 314) from the incoming operation queue 265*a*1-265*a*N. The incoming operation credit counter 282*b*1-282*b*N of the identified control set 250*b*1-250*b*N may then be incremented (block 308) as described above to indicate that another remote operation request may be sent by the other processor complex 122*a*.

The processor complex 122*a* may be informed of the availability of additional credits in a variety of manners. In the illustrated embodiment, the resource manager 226*b* compares (block 320) the accumulated credit count as indicated by the particular incoming operation credit counter 282*b*1-282*b*N of the identified control set 250*b*1-250*b*N to a particular threshold and if the accumulated credits exceed this threshold, the resource manager sends (block 322) the credit information to the processor complex 122*a* in a mail message via the mail manager 222*b*. Each credit sent to the processor complex 122*a* is an acknowledgment that a remote operation request has been successfully initiated. In addition, the particular incoming operation credit counter 282*b*1-282*b*N is reset (block 324) to await the accumulation of further credits as incoming operations are initiated. If the accumulated credits do not exceed (block 320) this threshold, the incoming operation credits are permitted to continue to accumulate as indicated by the incoming operation credit counter $282b1$-$282b$N of the identified control set $250b1$-$250b$N.

Once the resource manager $226b$ is ready to send a remote operation request to the other processor $122a$ using the same identified control set $250b1$-$250b$N, the resource manager $226b$ attaches (block 270, FIG. 4) the credit information of the incoming operation credit counter $282b1$-$282b$N of the identified control set $250b1$-$250b$N to the mail message containing the remote operation before it is sent. In addition, the incoming operation credit counter $282b1$-$282b$N of the identified control set $250b1$-$250b$N is reset (block 330).

If, for example, a requested remote operation is to be executed in connection with resource 1 of the remote processor complex $122b$, the resource manager $122b$ extracts (block 302) the requested operation from the mail message and identifies the control set $250b1$ which is associated with the resource 1 needed to execute the remote operation of the mail message. If the requested operation is successfully initiated (block 306), that is the resource 1 was available for the requested operation, processor complex $122b$ is ready for the processor complex $122a$ to send another remote operation request for resource1. Hence, an incoming operation credit counter $282b1$ of the identified control set $250b1$ is incremented (block 308), to acknowledge when sent, that another remote operation may be sent by the processor complex $122a$.

If on the other hand, the requested operation was not initiated (block 306) because the resource 1 could not be allocated to initiate the requested remote operation, the operation is placed (block 310) in the incoming operation queue $265b1$ of the identified control set $250b1$. The incoming operation credit counter $282b1$ of the identified control set $250b1$ is not incremented because a slot of the incoming operation queue $265b1$ was used to store the queued remote operation. However, the resource manager $226a$ may continue to send remote operation requests for that resource1 so long as there are credits indicated by the associated outgoing operation credit counter $264a1$ as described above until the credits are used up, indicating that the incoming operation queue $265b1$ is filled to capacity.

Once the associated resource 1 can be allocated, the first remote operation in the incoming operation queue $265a1$ to be executed in connection with resource 1 is initiated (block 312) and removed (block 314) from the incoming operation queue $265a1$. The incoming operation credit counter $282b1$ of the identified control set $250b1$ may then be incremented (block 308) as described above to indicate that another remote operation request may be sent by the other processor complex $122a$ for resource 1.

The resource manager $226b$ compares (block 320) the accumulated credit count as indicated by the incoming operation credit counter $282b1$ of the identified control set $250b1$ to a particular threshold and if the accumulated credits exceed this threshold, the resource manager sends (block 322) the credit information to the processor complex $122a$ in a mail message via the mail manager $222b$. In addition, the incoming operation credit counter $282b1$ is reset (block 324) to await the accumulation of further credits as incoming operations are initiated. If the accumulated credits do not exceed (block 320) this threshold, the incoming operation credits are permitted to continue to accumulate as indicated by the incoming operation credit counter $282b1$ of the identified control set $250b1$.

Once the resource manager $226b$ is ready to send a remote operation request for resource 1 to the other processor $122a$ using the same identified control set $250b1$, the resource manager $226b$ attaches (block 270, FIG. 4) the credit information of the incoming operation credit counter $282b1$ of the identified control set $250b1$ to the mail message containing the remote operation before it is sent. In addition, the incoming operation credit counter $282b1$ of the identified control set $250b1$ is reset (block 330).

FIG. 5 likewise illustrates operations of the resource manager $226a$ when a request for a remote operation is received from the other processor complex $122b$ or when a requested remote operation queued in one of the incoming operation queues $265a1$-$265a$N is initiated.

FIG. 4 also illustrates operations of the resource manager $226a$ when credit information is received (block 400) from the other processor complex $122b$. The resource manager $226a$ identifies (block 402) the control set $250a1$ ... $250a$N to which the credits from the other processor complex $122b$ apply. The resource manager $226a$ applies (block 404) the received credits to the outgoing operation credit counter $264a1$-$264$N of the identified control set $250a1$ ... $250a$N. Each applied credit increments the counter $264a1$-$264a$N and thus will permit the resource manager $226a$ to send another remote operation to the other processor complex $122b$ where each remote operation is executed in connection with the associated resource of resource 1-resource N of the identified control set $250a1$ ... $250a$N. If (block 406) there is a remote operation request in the associated outgoing operation queue $260b1$-$260b$N, that remote operation request is sent (blocks 270-330) to the other processor complex $122b$ for execution. Control returns to block 260 and any remaining queued remote operation requests are sent until the credits of the associated outgoing operation credit counter $264a1$-$264a$N are used up. At which time, the resource manager $226a$ awaits the receipt of additional credits from the other processor complex $122b$ to permit any remaining queued remote operation requests for the control set $250b1$-$250b$N to be sent. FIG. 4 likewise illustrates operations of the resource manager $226b$ when credit information is received from the other processor complex $122a$.

As previously mentioned, when upgrading the software or code of a device or system having multiple clusters, the software is often upgraded on one cluster while the other cluster continues to run. Then, the upgraded cluster is restarted and the software on the other cluster is upgraded. As a consequence, there may be intervals when the software code running the two clusters may be not be at the same level on both clusters.

Figure 6A:
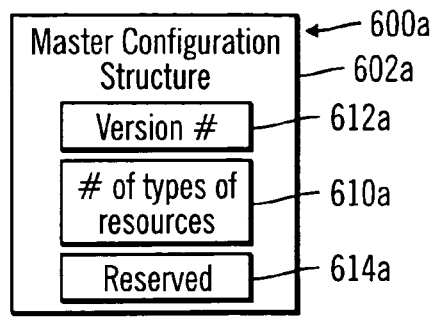
FIGS. 6A-6B each illustrate information in a remote operation manager configuration structure in accordance with implementations of the invention.
Figure 6A:
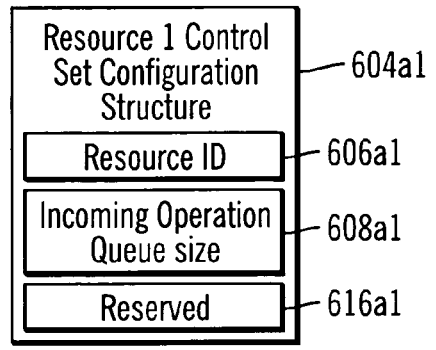
Figure 6A:
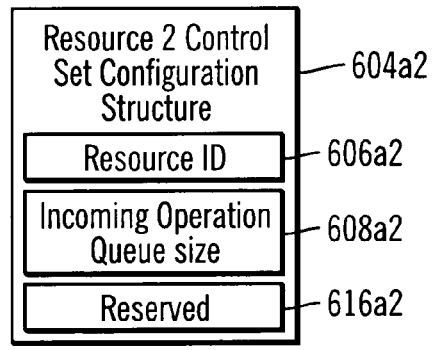
Figure 6A:
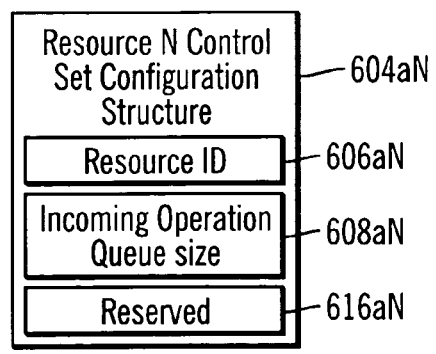
Figure 6B:
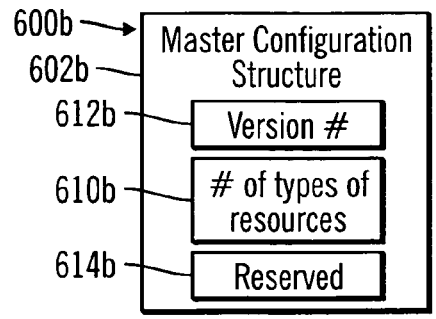
Figure 6B:
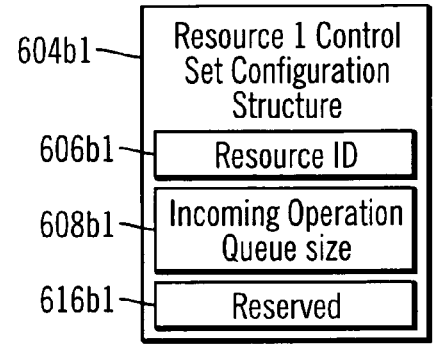
Figure 6B:
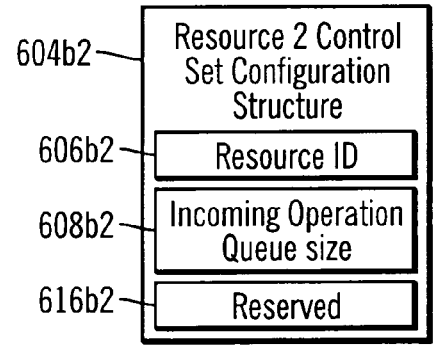
Figure 6B:
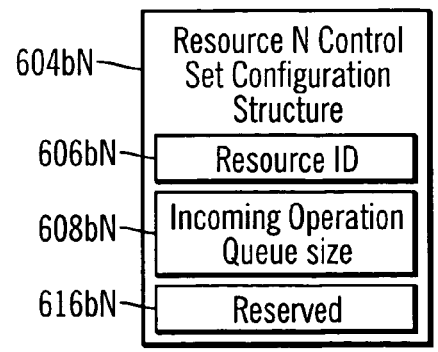

FIG. 6a shows an array $600a$ of configuration structures and FIG. 6b shows an array $600b$ of configuration structures which, as described in greater detail below, facilitate changes being made to the resource managers $226b$ and $226a$, respectively, in a concurrent code load environment. The array $600a$ includes a master configuration structure $602a$ and a plurality of control set configuration structures $604a1$, $604a2$ ... $604a$N for configuring the resource manager $226b$ of the processor complex $122b$. Similarly, the array $600b$ includes a master configuration structure $602b$ and a plurality of control set configuration structures $604b1$, $604b2$ ... $604b$N for configuring the resource manager $226a$ of the processor complex $122a$.

More specifically, the array $600b$ of configuration structures $602b$, $604b1$-$604b$N contains information about the control sets $250b1$, $250b2$ ... $250b$N of the resource manager $226b$ of the processor complex $122b$. In many applications it is desirable that the sending and receiving clusters agree on how many outstanding remote operation requests that the receiving cluster can accept for each resource1-resourceN. Thus, where the cluster 120*b* is to be the receiving cluster, the resource manager 226*b* of the processor complex 122*b* populates the configuration structure 600*b* with this information and passes the array 600*b* to the cluster that will be sending the remote operation requests, that is, the cluster 120*a*, via the mail manager 222*b* (FIG. 3B). When received, the resource manager 226*a* of the processor complex 122*a* extracts the configuration information from the array 600*b* and configures the control sets 250*a*1, 250*a*2 . . . 250*a*N of the resource manager 226*a* of the processor complex 122*a* to send the remote operation requests for each resource1-resourceN.

In the illustrated embodiment, the array 600*b* includes one resource control set configuration structure 604*b*1-604*b*N for each resource control set 250*b*1-250*b*N of the resource manager 226*b*. Each resource configuration structure 604*b*1-604*b*N contains information about its associated resource control set 250*b*1-250*b*N of the resource manager 226*b* which is used to configure the associated resource control set 250*a*1-250*a*N of the resource manager 226*a*. More specifically, each resource configuration structure 604*b*1-604*b*N includes a resource ID field 606*b*1-606*b*N which identifies the resource control set 250*b*1-250*b*N of the processor complex 122*b*, to which that particular resource configuration structure pertains. In addition, each resource configuration structure 604*b*1-604*b*N includes an incoming operation queue size field 608*b*1-6068N which specifies the size of the incoming operation queue 265*b*1-265*b*N of the resource control set 250*b*1-250*b*N identified by the field 606*b*1-606*b*N. The master configuration structure 602*b* contains a field 610*b* which identifies how many resource control set configuration structures 604*b*1-604*b*N the array 600*b* has and hence how many resource control sets 250*b*1-250*b*N the resource manager 226*b* has.

The master configuration structure 602*b* also contains a field 612*b* which identifies the version of the software code of the resource manager 226*b*. In addition, the master configuration structure 602*b* has a plurality of reserved fields 614*b* which reserve space for configuration information for future versions of control sets. Each resource configuration structure 604*b*1-604*b*N similarly has plurality of reserved fields 616*b* which provide similar capabilities.

Figure 7:
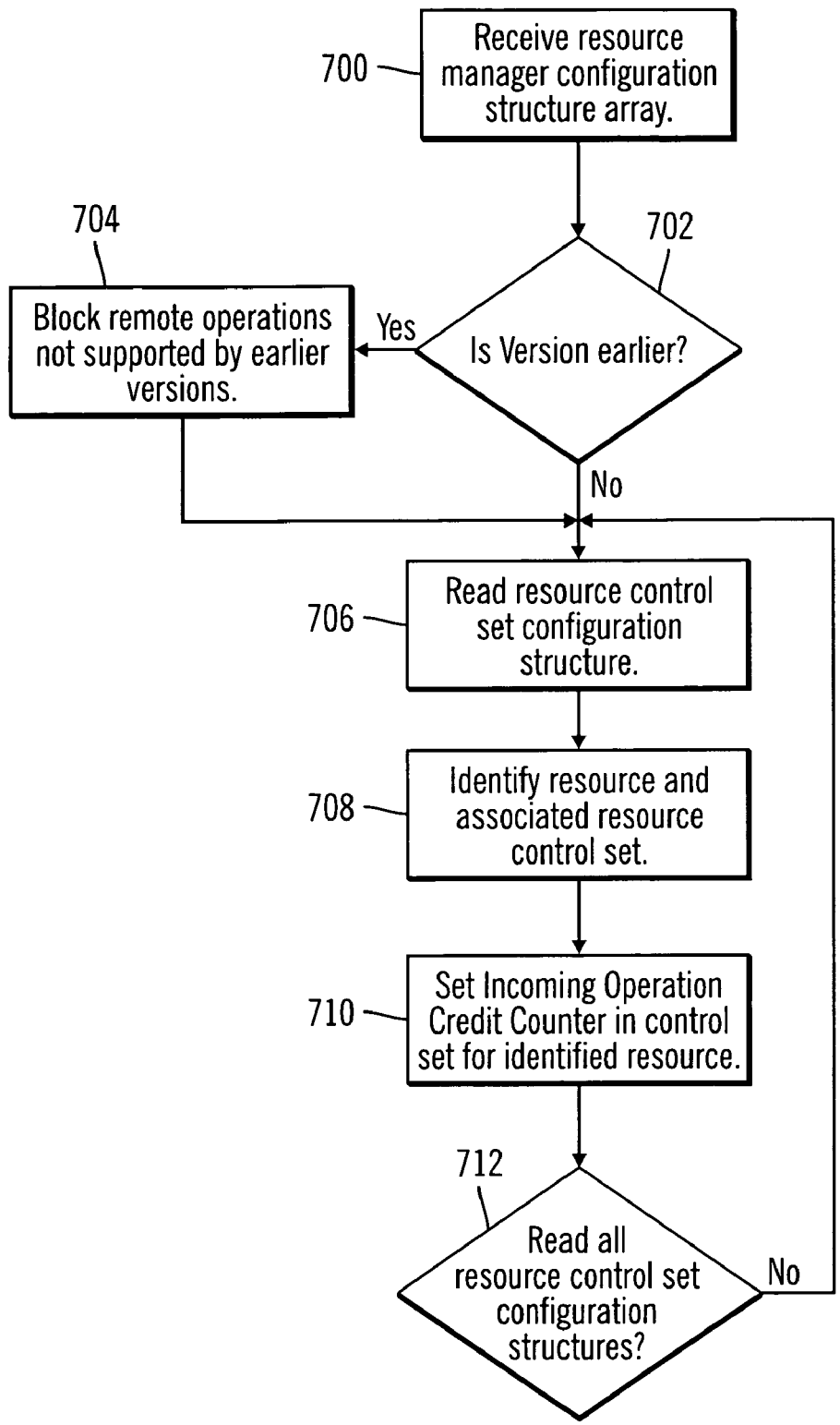
FIG. 7 illustrates logic to configure a remote operation manager in accordance with implementations of the invention.

FIG. 7 illustrates operations of the resource manager 226*a* of the processor complex 122*a* of the remote operation sending cluster 120*a* in extracting the configuration information from the configuration structure array 600*b* sent to the cluster 120*a* by the resource manager 226*b* of the remote operation receiving cluster 120*b*. Upon receipt (block 700) of the configuration structure 600*b* from the cluster 120*b*, the resource manager 226*a* of the cluster 120*a* examines (block 702) field 612*b* of the master configuration structure 602*b* and compares the version of the software code of the resource manager 226*b* of the cluster 120*b* to the version of the software code of the resource manager 226*a* of the cluster 120*a*. If the version of the software code of the resource manager 226*b* of the remote operation receiving cluster 120*b* is earlier than the version of the software code of the remote operation sending cluster 120*a*, the resource manager 226*a* of the cluster 120*a* blocks (block 704) the sending of remote operation requests to the other cluster 120*b* which may not be supported by the receiving cluster 120*b*.

After reading the master configuration structure 602*b*, the resource manager 226*a* reads-(block 706) a resource control set configuration structure 604*b*1-604*b*N of the array 600*b*. From the read resource control set configuration structure 604*b*1-604*b*N, the resource manager 226*b* examines (block 708) field 606*b*1-606*b*N to identify the resource of resource1-resourceN to which the configuration information contained in the particular resource control set configuration structure 604*b*1-604*b*N which was read pertains. The resource manager 226*a* also identifies the resource control set of control sets 250*a*1-250*a*N for that identified resource or allocates a control set if one has not already been allocated. The incoming operation credit counter 282*a*1-282*a*N of the identified resource control set 250*a*1-250*a*N is set (block 710) so that the initial count of the counter 282*a*1-282*b*N matches the incoming operation queue size of the counterpart resource control set 250*b*1-250*b*N of the receiving cluster 120*b*.

Thus, for example, if the field 606*b*1 of the first resource control set configuration structure read (block 706) identifies (block 708) the control set 250*b*1 with associated with resource 1, the queue size read (block 710) from the field 608*b*1 is the size of the incoming operation queue 265*b*1 of the resource 1 control set 250*b*1 of the resource manager 226*b* of the receiving cluster 120*b*. Thus, the size of the queue 265*b*1 is used to initialize the count of the incoming operation credit counter 282*a*1 of the resource 1 control set 250*a*1. As a consequence, the resource manager 226*a* of the remote operation sending cluster 120*a* will limit the number of outstanding remote operation requests sent to the receiving cluster 120*b* to be executed in connection with resource 1 of the cluster 120*b*, such that the capacity of the incoming operation queue 265*b*1 of the receiving cluster 120*b* for remote operation requests of the resource 1 type will not be exceeded.

The resource manager 226*a* determines (block 712) whether all of the resource control set configuration structures 604*b*1-604*b*N of the array 600*b* have been read. This may be determined, for example, by comparing the number of control set configuration structures 604*b*1-604*b*N read to the number of control set configuration structures 604*b*1-604*b*N sent to the resource manager 226*a* as indicated by the field 610*b* of the master configuration structure 602*b* of the array 600*b*. Each remaining control set configuration structure 604*b*1-604*b*N is read and the counterpart resource control set 250*a*1-250*a*N is configured using the information read from the read control set configuration structure 604*b*1-604*b*N until all of the control set configuration structures 604*b*1-604*b*N of the array 600*b* have been read.

The resource identification fields 606*b*1-606*b*N readily permit the resource control set configuration structures 604*b*1-604*b*N to be sent by the receiving cluster 102*b* to the remote operation sending cluster 102*a* in any order. In addition, the aforementioned fields and array structure facilitate changes to the resource manager control sets. However, it is appreciated that one or more fields may be modified or eliminated and the configuration structures modified, depending upon the particular application.

In a similar manner, the array 600*a* of configuration structures 602*a*, 604*a*1-604*a*N contains information about the control sets 250*a*1, 250*a*2 . . . 250*a*N of the resource manager 226*a* of the processor complex 122*a*. Where the cluster 120*a* is to be the remote operation receiving cluster, the resource manager 226*a* of the processor complex 122*a* populates the configuration structure 600*a* with this information and passes the array 600*a* to the cluster that will be sending the remote operation requests, that is, the cluster 120*b*, via the mail manager 222*a* (FIG. 3A). When received, the resource manager 226*b* of the processor complex 122*b* extracts the configuration information from the array 600*a* and configures the control sets 250*b*1, 250*b*2 . . . 250*b*N of the resource manager 226b of the processor complex 122b to send the remote operation requests for each resource1-resourceN.

In the illustrated embodiment, the array 600a includes one resource control set configuration structure 604a1-604aN for each resource control set 250a1-250aN of the resource manager 226a. Each resource configuration structure 604a1-604aN contains information about its associated resource control set 250a1-250aN of the resource manager 226a which is used to configure the associated resource control set 250b1-250bN of the resource manager 226b. More specifically, each resource configuration structure 604a1-604aN includes a resource ID field 606a1-606aN which identifies one of the resource control sets 250a1-250aN of the processor complex 122a. In addition, each resource configuration structure 604a1-604aN includes an incoming operation queue size field 608a1-6068N which specifies the size of the incoming operation queue 265a1-265aN of the identified resource control sets 250a1-250aN. The master configuration structure 602a contains a field 610a which identifies how many resource control set configuration structures 604a1-604aN the array 600a has and hence how many resource control sets 250a1-250aN the resource manager 226a has.

The master configuration structure 602a also contains a field 612a which identifies the version of the software code of the resource manager 226a. . In addition, the master configuration structure 602a has a plurality of reserved fields 614a which reserve space for configuration information for future versions of control sets. Each resource configuration structure 604a1-604aN similarly has plurality of reserved fields 616a which provide similar capabilities.

FIG. 7 also illustrates operations of the resource manager 226b of the processor complex 122b of the remote operation sending cluster 120b in extracting the configuration information from the configuration structure array 600a sent to the cluster 120b by the resource manager 226a of the remote operation receiving cluster 120a.

Additional Implementation Details

The described techniques for managing resources may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor complex. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

In the described implementations, certain operations were described as performed by the processor complexes 122a, and 122b. In alternative implementations, certain operations described as performed by the processor complexes may be performed by a variety of computers, processors, and controllers.

In described implementations, certain operations were described as incrementing and decrementing counters. It is appreciated that the "counts" of counters may be positive or negative and that "incrementing" or "decrementing" a count can make an actual count more negative or more positive or less negative or less positive, depending upon the particular application. Thus for example, if the incoming operation queue 265b1 has a maximum of 25 entries, the outgoing operation counter 264a1 may be initialized to "25" for example to represent 25 credits. Each time a remote operation request of the associated resource type is sent to the remote processor complex, the credits may then be "decremented" by reducing the count of the counter until the counter 264a1 reaches "0" indicating that the credits have been used up. Similarly, the outgoing operation counter 264a1 may be initialized to "0" for example to represent the same 25 credits. Each time a remote operation request of the associated resource type is sent to the remote processor complex, the count of credits may then be "decremented" by increasing the count of the counter 264a1 until the counter 264a1 reaches "25" indicating that the credits have been used up.

The described implementations for resource management were described for use with systems deployed in a data environment where high availability is of value. However, those skilled in the art will appreciate that the resource management operations described herein may apply to computational and storage systems used for non-critical data.

In the described implementations, dual clusters were provided. In alternative implementations, there may be more than two clusters and resource management may be practiced in any of the other clusters.

The illustrated logic of FIGS. 4, 5 and 7 show certain events occurring in a certain order. In alternative implementations, certain operations may be performed in a different order, modified or removed. Morever, steps may be added to the above described logic and still conform to the described implementations. Further, operations described herein may occur sequentially or certain operations may be processed in parallel. Yet further, operations may be performed by a single processing unit or by distributed processing units.

The variable N is used to denote any integer variable for certain of the described elements and may indicate a same or different integer value when used in different instances.

Figure 1:
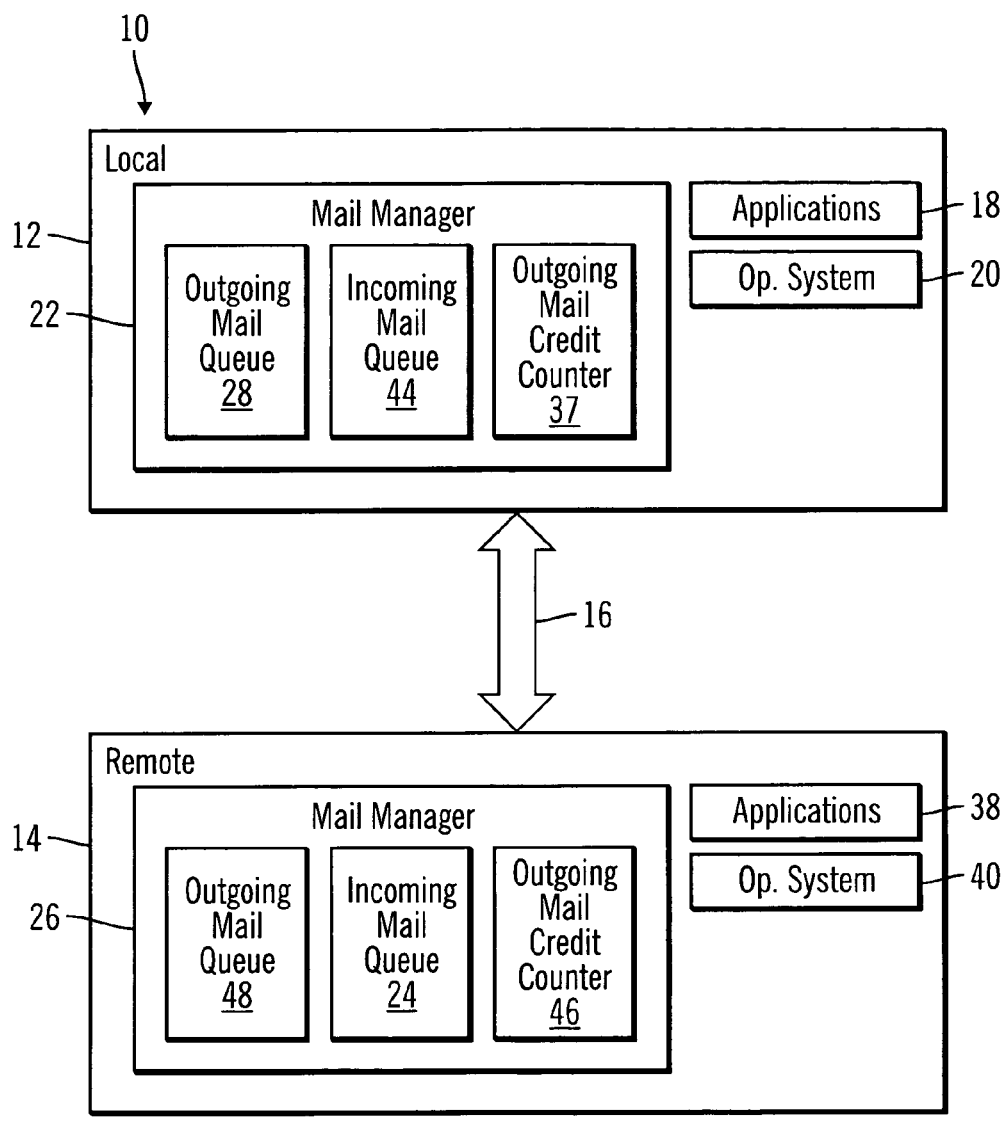
FIG. 1. 1 illustrates a prior art mail manager for sending mail messages between processors.
Figure 8:
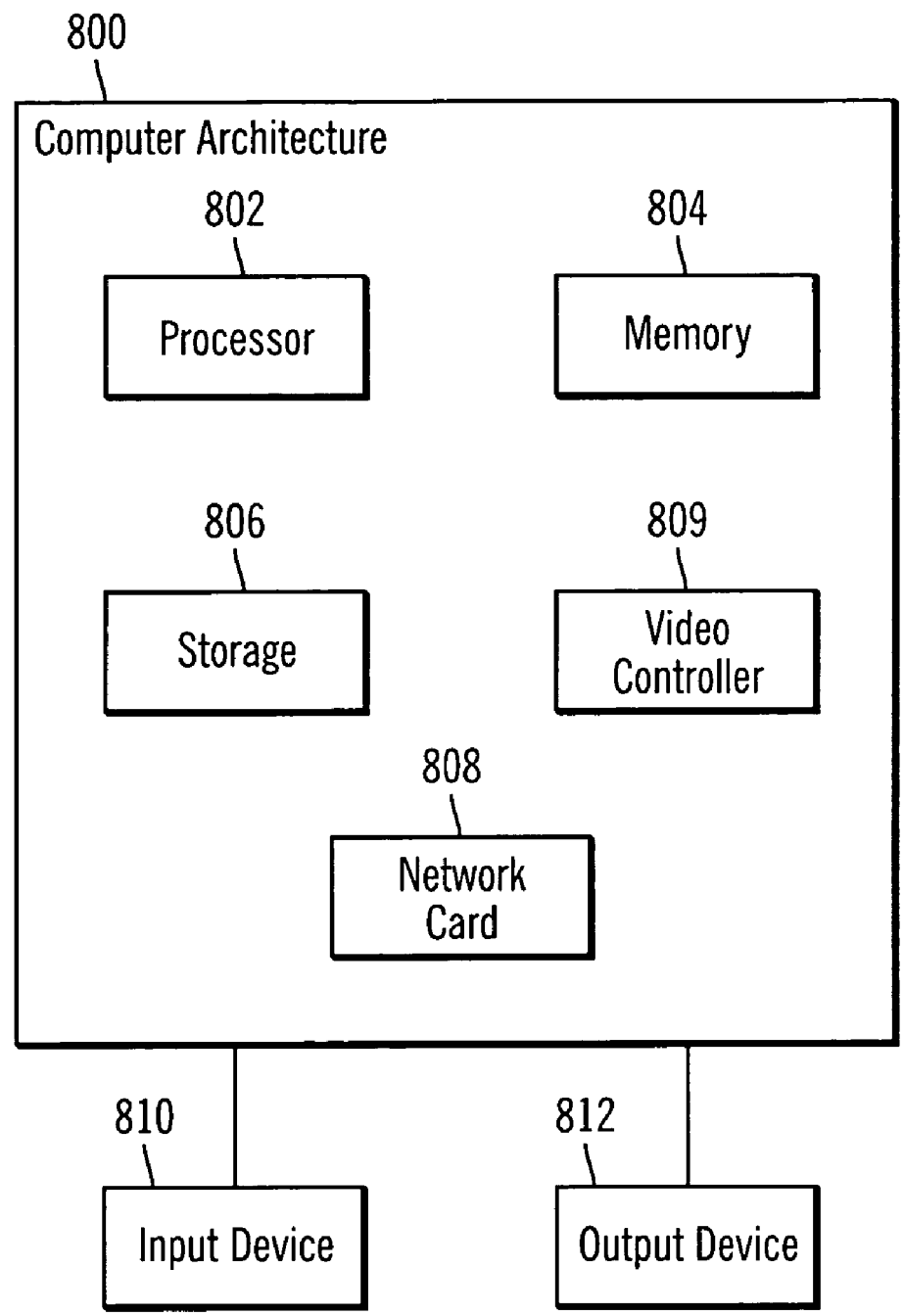
FIG. 8 illustrates an architecture of computing components in a network environment, such as the hosts, storage controllers, clusters, and any other computing devices.

FIG. 8 illustrates one implementation of a computer architecture 800 of the network components, such as the hosts and storage controller clusters shown in FIG. 1. The architecture 800 may include a processor 802 (e.g., a microprocessor), a memory 804 (e.g., a volatile memory device), and storage 806 (e.g., a non-volatile storage, such as magnetic disk drives, optical disk drives, a tape drive, etc.). The storage 806 may comprise an internal storage device or an attached or network accessible storage. Programs in the storage 806 are loaded into the memory 804 and executed by the processor 802 in a manner known in the art. The architecture further includes a network card 808 to enable communication with a network. An input device 810 is used to provide user input to the processor 802, and may include a keyboard, mouse, pen-stylus, microphone, touch sensitive display screen, or any other activation or input mechanism known in the art. An output device 812 is capable of rendering information transmitted from the processor 802, or other component, such as a display monitor, printer, storage, etc.

The foregoing description of various implementations of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method comprising:
   receiving from a remote processor a configuration structure indicating the maximum number of entries in a first queue maintained by said remote processor wherein each entry in the first queue is adapted to store a remote operation request of a first resource type sent to the remote processor from a local processor to await execution in connection with a first resource in the remote processor; and
   initializing a first count of credits of a first resource type control set maintained by a local processor wherein said first count of credits represents the maximum number of entries in said first queue.

2. The method of claim 1 further comprising:
   receiving from said remote processor a configuration structure indicating the maximum number of entries in a second queue maintained by said remote processor wherein each entry in the second queue is adapted to store a remote operation request of a second resource type sent to the remote processor from the local processor to await execution in connection with a second resource in the remote processor; and
   initializing a second count of credits of a second resource type control set maintained by the local processor wherein said second count of credits represents the maximum number of entries in said second queue.

3. The method of claim 2 wherein a configuration structure is sent as a part of a boot-up sequence of said remote processor.

4. The method of claim 2 wherein said configuration structure indicating the maximum number of entries in said first queue is a first control set configuration structure which also includes identification information which identifies said first resource type and wherein said configuration structure indicating the maximum number of entries in said second queue is a second control set configuration structure which includes identification information which identifies said second resource type.

5. The method of claim 4 further comprising receiving from said remote processor a master configuration structure which identifies the number of control set configuration structures being sent to said local processor by said remote processor.

6. The method of claim 5 wherein at least one configuration structure includes reserved fields.

7. The method of claim 5 wherein said first and second queues for storing remote operation requests are generated by software executed by said remote processor and wherein said master configuration structure includes information which identifies the version of the remote operation request queue software.

8. An article of manufacture for managing remote operation requests sent from a local processor to a remote processor, wherein the article of manufacture causes operations to be performed, the operations comprising:
   receiving from a remote processor a configuration structure indicating the maximum number of entries in a first queue maintained by said remote processor wherein each entry in the first queue is adapted to store a remote operation request of a first resource type sent to the remote processor from a local processor to await execution in connection with a first resource in the remote processor; and
   initializing a first count of credits of a first resource type control set maintained by a local processor wherein said first count of credits represents the maximum number of entries in said first queue.

9. The article of manufacture of claim 8 further comprising the operations of:
   receiving from said remote processor a configuration structure indicating the maximum number of entries in a second queue maintained by said remote processor wherein each entry in the second queue is adapted to store a remote operation request of a second resource type sent to the remote processor from the local processor to await execution in connection with a second resource in the remote processor; and
   initializing a second count of credits of a second resource type control set maintained by the local processor wherein said second count of credits represents the maximum number of entries in said second queue.

10. The article of manufacture of claim 8 wherein a configuration structure is sent as a part of a boot-up sequence of said remote processor.

11. The article of manufacture of claim 9 wherein said configuration structure indicating the maximum number of entries in said first queue is a first control set configuration structure which also includes identification information which identifies said first resource type and wherein said configuration structure indicating the maximum number of entries in said second queue is a second control set configuration structure which includes identification information which identifies said second resource type.

12. The article of manufacture of claim 11 further comprising the operations of said remote processor sending to said local processor a master configuration structure which identifies the number of control set configuration structures being sent to said local processor by said remote processor.

13. The article of manufacture of claim 12 wherein at least one configuration structure includes reserved fields.

14. The article of manufacture of claim 12 wherein said first and second queues for storing remote operation requests are generated by software executed by said remote processor and wherein said master configuration structure includes information which identifies the version of the remote operation request queue software.

15. A system, comprising:
   a local processor having a first resource management means for sending remote operation requests of at least a first resource type; and a remote processor having a first resource means for permitting execution of a remote operation request of the first resource type, and a second resource management means for receiving remote operation requests of the first resource type, said second resource management means having a first queue means including a plurality of entries for storing a remote operation request of the first resource type sent to the remote processor from the local processor to await execution in connection with said first resource means in the remote processor, and means for sending to said local processor a first configuration structure indicating the maximum number of entries in said first queue.

16. The system of claim 15 wherein said local processor first resource management means has a first resource type control set which includes a first credit counter, and means responsive to said configuration structure, for initializing said first credit counter to represent the maximum number of entries in said first queue means.

17. The system of claim 16 wherein said local processor first resource management means includes means for sending remote operation requests of at least a second resource type, and wherein said remote processor has a second resource means for permitting execution of a remote operation request of the second resource type, and wherein said second resource management means has means for receiving remote operation requests of the second resource type, said second resource management means further having a second queue means including a plurality of entries for storing a remote operation request of the second resource type sent to the remote processor from the local processor to await execution in connection with said second resource means in the remote processor, and means for sending to said local processor a second configuration structure indicating the maximum number of entries in said second queue.

18. The system of claim 17 wherein said local processor first resource management means has a second resource type control set which includes a second credit counter, and means responsive to said second configuration structure, for initializing said second credit counter to represent the maximum number of entries in said second queue means.

19. The system of claim 15 wherein said remote processor has a boot-up sequence and a configuration structure is sent as a part of the boot-up sequence of said remote processor.

20. The system of claim 18 wherein said first configuration structure also includes identification information which identifies said first resource type control set and wherein said second configuration structure includes identification information which identifies said second resource type control set.

* * * * *